(12) United States Patent
Tischler

(10) Patent No.: US 11,714,551 B2
(45) Date of Patent: Aug. 1, 2023

(54) CREDENTIAL MANAGER WITH ACCOUNT SELECTION AND RESOURCE LOAD-BALANCING

(71) Applicant: EMC IP Holding Company LLC, Hopkinton, MA (US)

(72) Inventor: Wyatt Tischler, Hollis, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 164 days.

(21) Appl. No.: 17/070,413

(22) Filed: Oct. 14, 2020

(65) Prior Publication Data

US 2022/0113872 A1 Apr. 14, 2022

(51) Int. Cl.
*G06F 3/06* (2006.01)

(52) U.S. Cl.
CPC ............ *G06F 3/0605* (2013.01); *G06F 3/067* (2013.01); *G06F 3/0635* (2013.01); *G06F 3/0637* (2013.01)

(58) Field of Classification Search
CPC .... G06F 3/0605; G06F 3/0635; G06F 3/0637; G06F 3/067
See application file for complete search history.

(56) References Cited

U.S. PATENT DOCUMENTS

| | | | | |
|---|---|---|---|---|
| 10,540,607 | B1* | 1/2020 | Oldridge | G06N 20/00 |
| 11,182,844 | B2* | 11/2021 | Chen | G06Q 20/405 |
| 2009/0164464 | A1* | 6/2009 | Carrico | G06Q 50/10 |
| | | | | 707/999.005 |
| 2009/0164516 | A1* | 6/2009 | Svendsen | H04L 67/535 |
| 2014/0074824 | A1* | 3/2014 | Rad | G06F 3/0482 |
| | | | | 707/722 |
| 2014/0108474 | A1* | 4/2014 | David | H04L 67/568 |
| | | | | 707/827 |
| 2016/0140335 | A1* | 5/2016 | Proulx | H04L 9/0863 |
| | | | | 726/6 |
| 2016/0292193 | A1* | 10/2016 | Madanapalli | H04L 67/1097 |
| 2017/0331880 | A1* | 11/2017 | Crofton | G06F 16/182 |
| 2017/0339070 | A1* | 11/2017 | Chang | H04L 41/12 |
| 2018/0032327 | A1* | 2/2018 | Adami | H04W 4/50 |
| 2018/0115551 | A1* | 4/2018 | Cole | H04L 63/083 |
| 2019/0028485 | A1* | 1/2019 | Baird | H04L 67/146 |
| 2019/0114335 | A1* | 4/2019 | Koenig | G06F 16/2365 |
| 2020/0092801 | A1* | 3/2020 | Boss | H04W 48/18 |
| 2020/0301916 | A1* | 9/2020 | Nguyen | G06F 16/3344 |
| 2021/0409409 | A1* | 12/2021 | Palanisamy | H04L 67/10 |

* cited by examiner

*Primary Examiner* — Michael A Keller
*Assistant Examiner* — Thao D Duong
(74) *Attorney, Agent, or Firm* — Amin, Turocy & Watson, LLP

(57) ABSTRACT

The described technology is generally directed towards managing accounts for connecting applications to (e.g., third party) cloud storage providers. Various types of cloud storage providers and different accounts, e.g. corresponding to different usage scenarios with properties such as regions, storage tier levels, costs and so forth, are available to user applications. In one implementation, a user application provides desired account properties to a cloud credential manager via a REST API call to obtain the account information for an account, including credentials, configuration data and the like, returned in in a REST API response. The described technology facilitates selection of an account by the cloud credential manager based on matching the specified properties. Load balancing and storage costs can also be factors in the selection, and random selection is also available.

20 Claims, 10 Drawing Sheets

CREDENTIAL MANAGER WITH ACCOUNT SELECTION AND RESOURCE LOAD-BALANCING

TECHNICAL FIELD

The subject application relates generally to data storage, and, for example, to a technology that manages credentials for cloud storage accounts and facilitates intelligent selection of a cloud storage account, which can be based on load balancing, and related embodiments.

BACKGROUND

Contemporary data storage systems, such as DELL EMC's ISILON platform, via its CLOUDPOOLS feature, supports many different third party cloud storage providers. This includes cloud storage providers with multiple permutations, such as those that support various storage regions, provide different tiers for data storage, have different endpoints and so forth.

An account needs to be set up for each cloud storage provider permutation. Such accounts also need to be maintained, as the accounts and their respective passwords need to be changed or deleted from time to time. There are also periods of time when one or more cloud storage providers are inaccessible because of maintenance or service outages.

As a result, for a given account, the account information needs to be stored in a location that is accessible to anyone using (including testing) the account, such as users of the CLOUDPOOLS feature. To make the information accessible, one solution was for the account information to be published (e.g., in documents), but this meant that the account information could be copied or shared, which was deemed not sufficiently secure. A more secure solution was to hardcode the account information into the applications that used the accounts; however this leads to problems because updating the account information corresponds to having to update the application.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
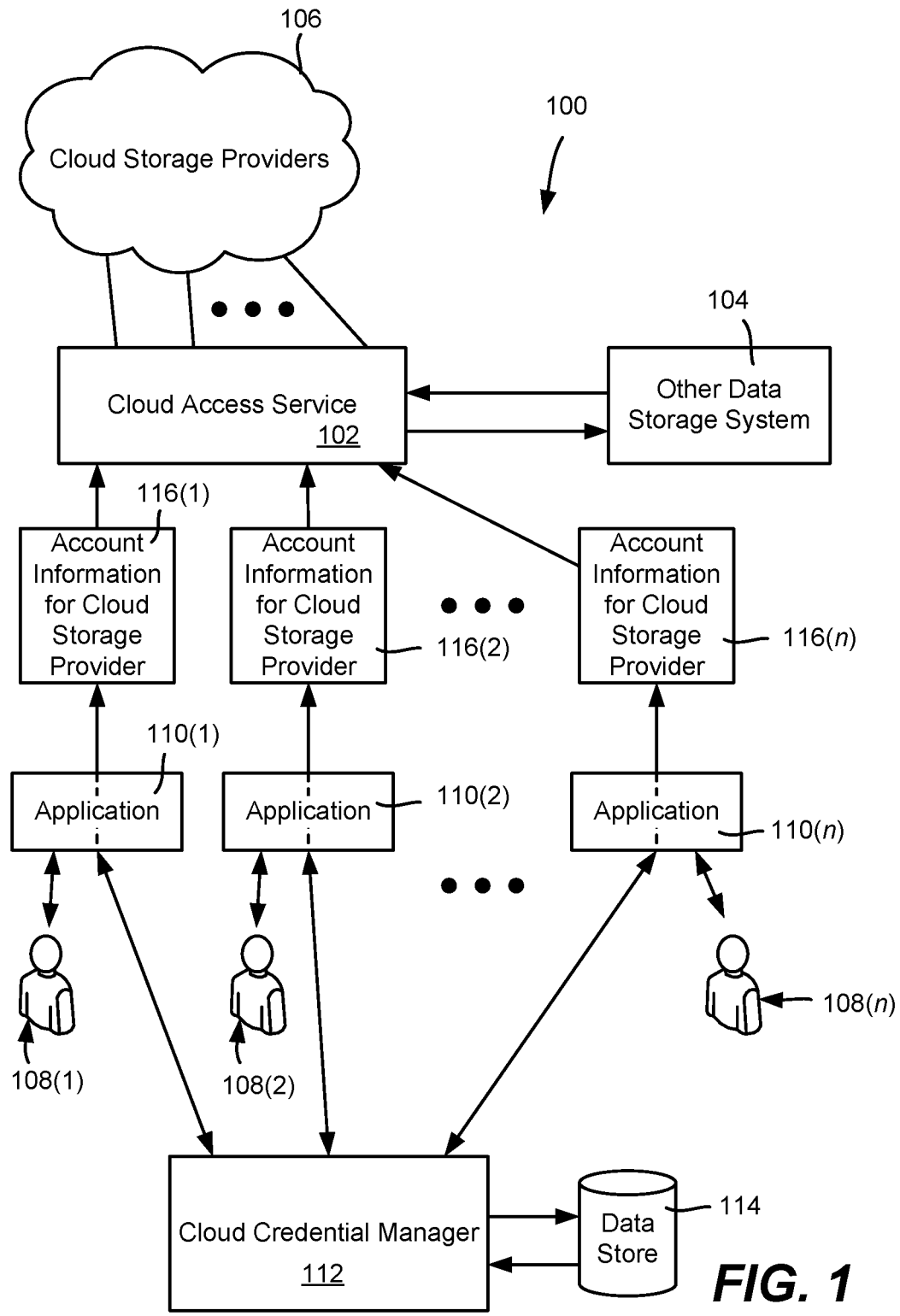
FIG. 1 is a block diagram representation of example components related to managing and providing account information for connecting to cloud storage provider accounts, in accordance with various aspects and implementations of the subject disclosure

Various aspects of the technology described herein are generally directed towards providing more convenient and secure access to account information used with cloud data storage provider accounts. In one implementation, the access is provided via a system comprising internally accessible, geographically distributed servers accessed via a REST API (representational state transfer application programming interface) and a cloud credential manager that stores and manages the account information for multiple accounts. Further, relevant account information can be intelligently selected based on user-specified properties of a requested account type, as well as other factors such as cost and load balancing considerations.

The technology thus provides advantages over existing solutions, including that an account can be requested by any combination of properties, e.g., provider type, storage region, storage type, supported authentication mode, provider status, team using the account, and so forth. As one example, when testing a cloud storage provider, tests can be developed in a more generic fashion, with the account information dynamically retrieved at the beginning of each test. If desired, an account and its related information can be selected at random to help ensure generally equal testing of multiple supported providers and configurations. As another example, sometimes a user simply needs an account to temporarily store some data, and thus does not particularly care which account is selected, in which event load balancing can select a free or low cost account, or one that helps distribute a company's overall load.

Further, via the centralized storage and access, which can be accessed via enterprise-internal URLs corresponding to the REST APIs, accounts can be updated on demand as needed, with applications able to begin using the new account information virtually immediately. Account information no longer has to be hardcoded or published in documents or other unsecure locations.

As described herein, the described technology's system is able to track and load balance usage across the accounts to help distribute usage across those accounts. For example, for a cloud storage provider with multiple accounts, tracking and/or load balancing the usage across the accounts allows an enterprise consumer to take advantage of the free or very low cost storage tier (offered by most providers up to some threshold number of bytes or transactions), which decreases overall cloud storage costs.

Still further, accounts in the system can be marked as offline or online as needed, e.g., so as to not attempt use while offline for maintenance. In one or more implementations, the system provides account information for use by CLOUDPOOLS and network data management protocol teams.

It should be understood that any of the examples herein are non-limiting. For instance, some of the examples refer to testing cloud storage providers, such as for CLOUDPOOLS; however virtually any application that works with first or third party data storage accounts may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a system 100 that includes a cloud access service 102, such as part of another data storage system 104, which provides access to multiple cloud storage providers 106. One non-limiting example of a cloud access service 102 and other data storage system 104 corresponds to CLOUDPOOLS and ISILON, respectively.

As described herein, users 108(1)-108(n) via respective application programs (application) 110(1)-110(n) interact with the cloud storage provider accounts via the cloud access service 102. A non-limiting example of such applications are test applications that are run to ensure that the cloud storage provider accounts are properly configured to meet storage requirements and the like for use with actual client data. Generally, such applications are internal to an enterprise, call internal URLs, and/or are secured via user credentials and the like. Note that a user can have multiple applications running at the same time, e.g., to run tests with different cloud storage accounts generally in parallel.

As described herein, the applications 110(1)-110(n) communicate with a cloud credential manager 112, shown as coupled to a suitable data store 114, to obtain a dataset of account information (shown as blocks 116(1)-116(n)) for a cloud storage provider account. The account information dataset for a particular account includes credentials (e.g., username and password) and can include any other configuration parameters needed to access and/or use that account. As will be understood, a cloud storage provider account can be specified by a user/application, can be selected randomly by the cloud credential manager 112, or can be selected by the cloud credential manager 112 based on matching property data provided by the user and corresponding application. Load balancing and cost can also be factored into an account selection made by the cloud credential manager 112.

Figure 2:
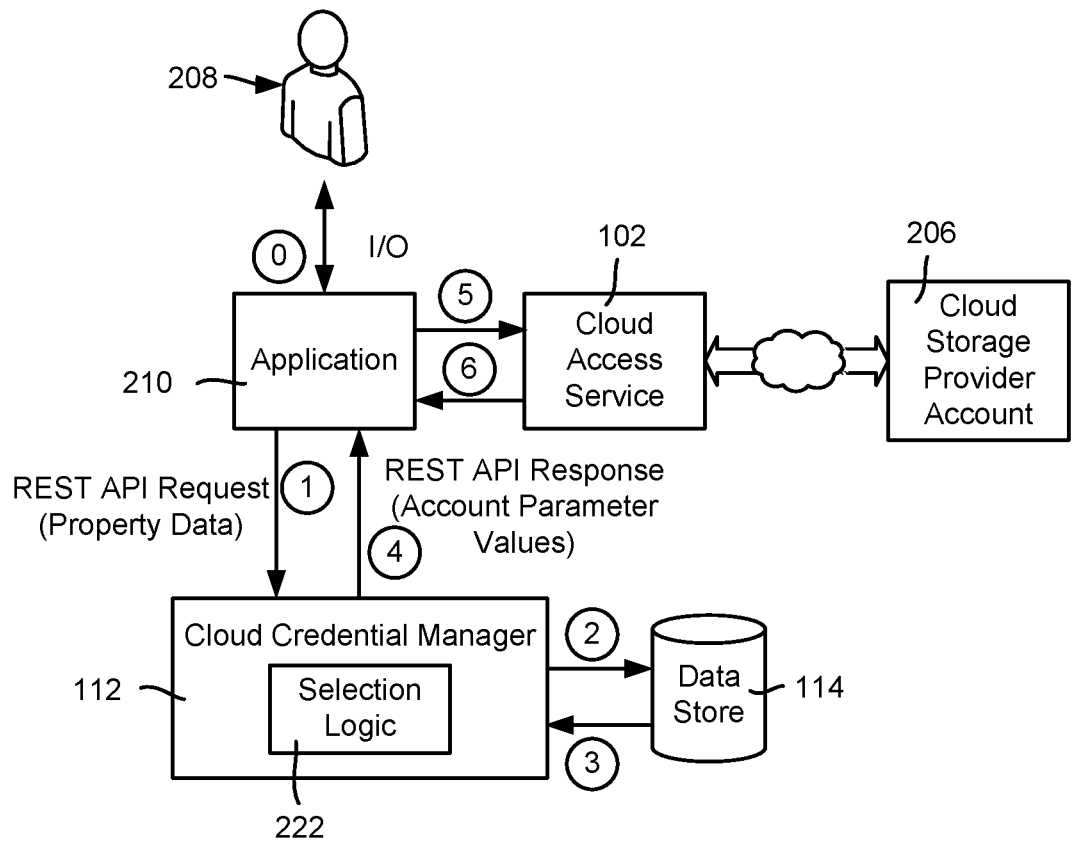
FIG. 2 is a block diagram representation of example components and dataflow operations related to obtaining account information for connecting to a cloud storage provider account, in accordance with various aspects and implementations of the subject disclosure

FIG. 2 summarizes a user 208 interacting with an application 210, as represented by the arrow labeled zero (0), in order to obtain account information needed to access a cloud storage account via the cloud access service 102. In turn, in this example the application makes a REST API call to the cloud credential manager 112 (arrow one (1)), providing the property data or other data (e.g., a request for a randomly selected account) needed by selection logic 222 to select a suitable account.

As represented via labeled arrows two (2) and three (3), the cloud credential manager 112 requests one or more matching accounts from the data store 114. If more than one matching account is returned as candidate accounts, the selection logic 222 selects one account, as generally described herein with reference to FIGS. 4 and 5. In this example the account information for the selected account, e.g., comprising a dataset of account parameter values including an account identifier, credentials and any other configuration data/variable data, is returned in a suitable REST API response, as represented via labeled arrow four (4). The application 210 uses this returned information to interact with and use the cloud access service 102/the cloud storage provider account 206, as represented via labeled arrows five (5) and six (6).

Figure 3:
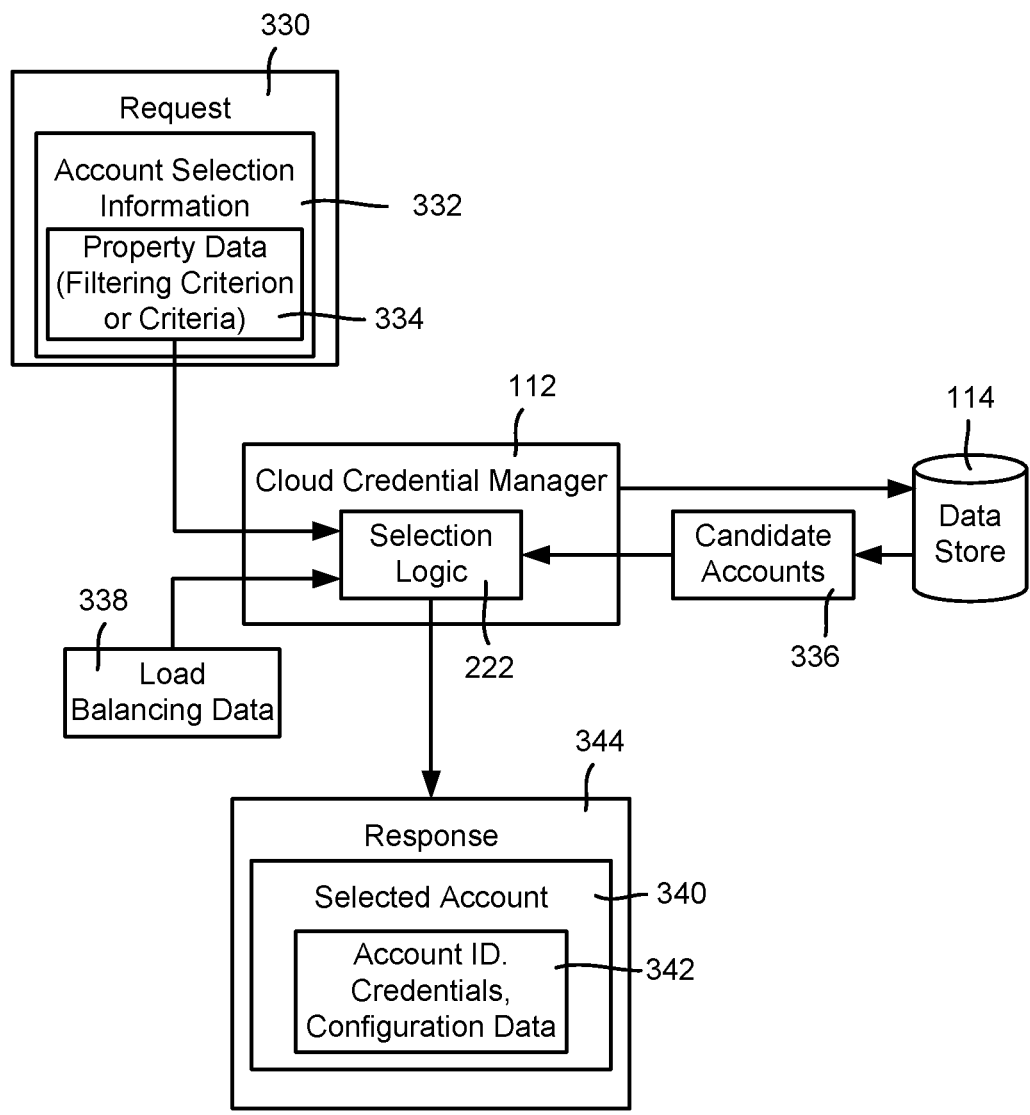
FIG. 3 is a block diagram representation of example components and data used in obtaining selected account information for connecting to a cloud storage provider account, in accordance with various aspects and implementations of the subject disclosure FIGS. 4 and 5 comprise a flow diagram showing example operations for returning cloud storage provider account information in response to a request, in accordance with various aspects and implementations of the subject disclosure.

FIG. 3 shows an example in which a request 330 comprising account selection information 332 such as property data (e.g., used as filtering criterion or criteria) 334 is made to the cloud credential manager 112. In this example, consider that the query to the data store 114 results in multiple candidate accounts 336 being returned. Note that the query to the data store 114 can contain some narrowing criteria, e.g., return the information for one or more accounts from some cloud provider Z (and no others), so that the selection logic can deal with a smaller subset of the (typically many) available accounts.

In this example of multiple candidate accounts, the selection logic 222 uses any (e.g., additional) property data 334 to select an account from among the candidate accounts 336, as generally described with reference to FIGS. 4 and 5. Load balancing data 338, which can include cost information, also can be a factor in the account selection.

In response to the request, the selected account 340, e.g., a dataset including account information (block 342) comprising an account identifier (e.g., name), password and possibly other credentials and configuration data is returned in a corresponding response 344. It should be noted that a response can indicate an error message such as "account is offline" or the like, such as if the request specifies that a particular account is desired which needs to be online, and that particular account is not online.

The following are some non-limiting examples of supported properties that can be used as the property data 334; not all of the properties need be specified. As is understood, the examples can be expanded as needed, e.g., based on the needs of the account and/or customer use case. Note that the property names that are meaningful for actual usage scenarios, but could be any string value, or even a numerical code. The parameter values of these properties can be a simple string, integer, hash, list or other common data types.

Example Properties:

| | |
|---|---|
| team_name | The workgroup (team or department) to which this account belongs. |
| cloud_type | The cloud provider hosting this account |
| account_id | A unique account identifier. Useful for occasions in which a specific account needs to be requested. |
| region | Cloud providers can offer users the ability to select resources in different countries or regions within a country. |
| online | Used to identify if the online and available for use. Sometimes accounts are taken offline for maintenance or are temporally unavailable. |
| created | A date/time stamp of when the account was created. |
| last_used | The last time the account matched the request and was retuned for use. |
| last_updated | The last time the account information was updated, i.e. updated username, password, status, etc. |
| storage_tier | Most providers offer cloud storage with varying levels of performance and resiliency using different pricing models. |
| sig_ver | What version of Signature/Authentication is support, e.g., Version2 or Version4. |
| key | For more secure accounts an additional "token/password" is needed. |
| secret | Similar to a username |
| token | Similar to a password |
| billing_bucket | Some cloud providers write billing data to a specific location for customers to access |
| weight | Weighted values can be used to give preference to one account over another when pseudo-randomly selecting accounts. |

Figure 4:
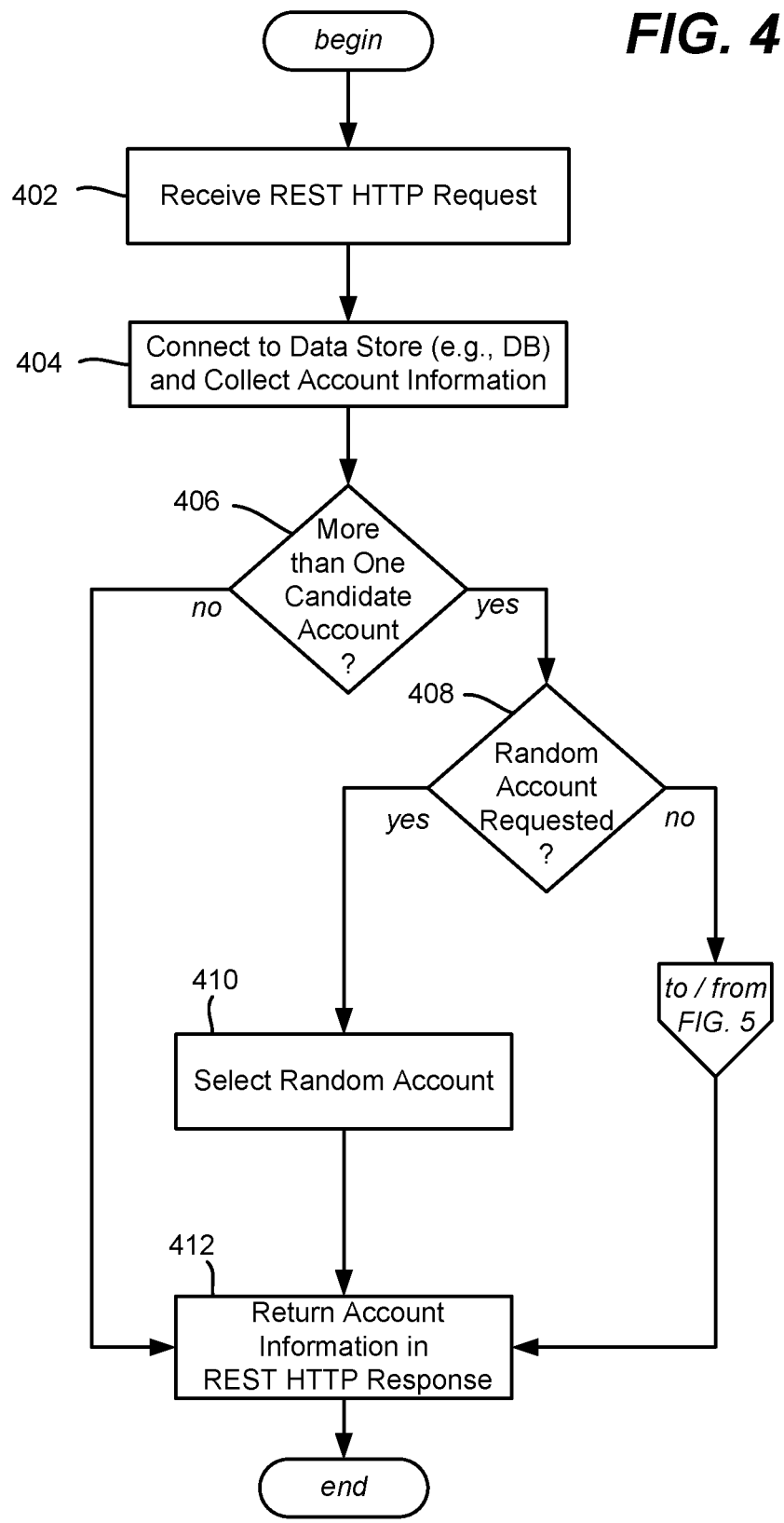
Figure 5:
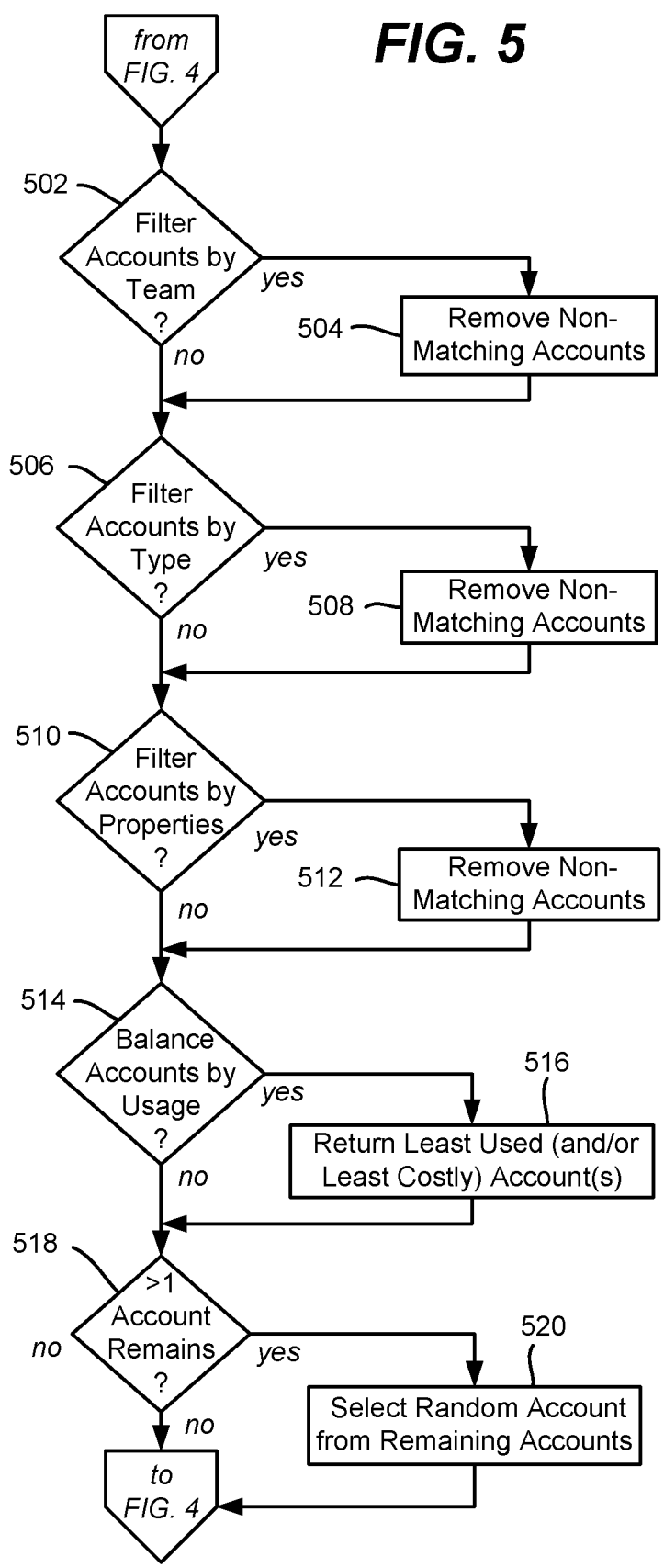

The following are some non-limiting examples of queries, e.g., made via HTTP REST APIs:

Query for any account belonging to the "DEV" team:
  http://credmgr.xyz.com/ccm/v2.0/teams/dev
Query for a random account:
  http://credmgr.xyz.com/ccm/v2.0/types/random
Query for an S3 (simple storage service) account:
  http://credmgr.xyz.com/ccm/v2.0/types/s3
Query for an S3 account in the "eu-central-1" region:
  http://credmgr.xyz.com/ccm/v2.0/types/s3?region=eu-central-1
Query for a specific account using the unique "account_id":
  http://credmgr.xyz.com/ccm/v2.0/accounts/111-222-333
Query for all accounts currently offline:
  http://credmgr.xyz.com/ccm/v2.0/accounts?online=false
Query for an S3 account, that is online, in the "us-west-1" region, has a key of "User1" and a storage tier of "standard":
  http://credmgrxyz.com/ccm/v2.0/types/s3?online=true&region=us-west-1&key=User1&storage_tier=standard FIGS. 4 and 5 show example operations of one implementation of the selection logic of a cloud credential manager, beginning at operation 402 where the REST HTTP request is received. Operation 404 represents the cloud credential manager connecting to the data store (e.g., database) to collect account information. The query may narrow the search, may be optimized and so forth to reduce the number of accounts returned.

If only one account is returned from the data store, e.g., the REST API call specified a unique ID which was forwarded in the data store query, operation 406 branches to operation 412 to return the account information in a REST API response. Similarly, if no matching accounts are returned, a suitable response such as one that indicates why no account matched (e.g., a unique ID was specified in the REST API and corresponding query but no such account exists, and so forth), operation 406 can branch to operation 412 to provide such a response.

If more than one account was returned and random selection was not specified as evaluated at operation 408, operation 408 branches to operation 410 to select a random account. Note that in one implementation, random selection allows for different accounts to be selected, such as for testing purposes; however in alternative implementations, pseudorandom selection can occur, such as based on random selection among those not previously selected, load balancing and/or cost, and so forth.

If there are multiple candidate accounts (as evaluated at operation 406) and random account selection is not requested, operation 408 branches to operation 502 of FIG. 5. Weight-based pseudorandom selection is also available via a property parameter as generally described herein.

Operation 502 represents filtering the accounts by workgroup (exemplified in FIG. 5 as a team, but generally any organizational group or possibly an individual). Note, for example, that one team such as a testing team may have access to a full set of accounts, while another team such as accounting may have access to only accounts that have a certain storage tier corresponding to strong data protection and integrity. Another team may need a storage tier that provides highly reliable data storage with fast I/O access. A team in Europe may not have access to the accounts in the United States, and so forth. If team-based filtering is applicable, operation 504 removes the non-matching accounts from the candidate set.

Operations 506 and 508 represent filtering the accounts by type, e.g., if a cloud storage provider is specified. Note that such filtering can occur to some extent at the data store query level, but type-based filtering can also narrow the candidate account set based on region within a type and the like. Note that in one implementation, "region" is considered a "property" rather than a "type" with respect to filtering.

Operations 510 and 512 represent filtering the accounts by other specified property data, such as region, storage tier and others, such as from the examples properties set forth above. As is readily understood, query-based narrowing, and/or whether a parameter (e.g., region) is considered a "type" filtering parameter or a "property" parameter is implementation specific, and thus the dividing lines between query-based narrowing and the evaluations at operations 506 and 510 can be arbitrary, and depend on a given implementation.

Operation 514 represents evaluating whether to balance the accounts by usage, which can include cost. Usage can be tracked in various ways, including maintaining a counter per account that increments with each selection, the amount of data currently (and/or previously) stored per account, and so forth. In the example of FIG. 5, the least used account is returned at operation 516 if load balancing is specified or otherwise active (e.g., by default as set by an administrator for a team). FIG. 516 also represents the ability to return a least costly account (e.g., a free tier if free space or some number of free storage transactions remain), which can be specified or selected by default (e.g., as set by an administrator for a workgroup team).

If at operation 518 more than one account remains after parameter-based filtering and/or any load balancing filtering as described herein, operation 520 selects an account randomly from the remaining accounts. The process returns to operation 412 of FIG. 4 to return the selected account. Note that as before, it is possible that no account matched the criteria (e.g., offline account(s) were requested via the property selection information, but none were offline), in which event the REST HTTP response can indicate such a "not found" state.

Figure 6:
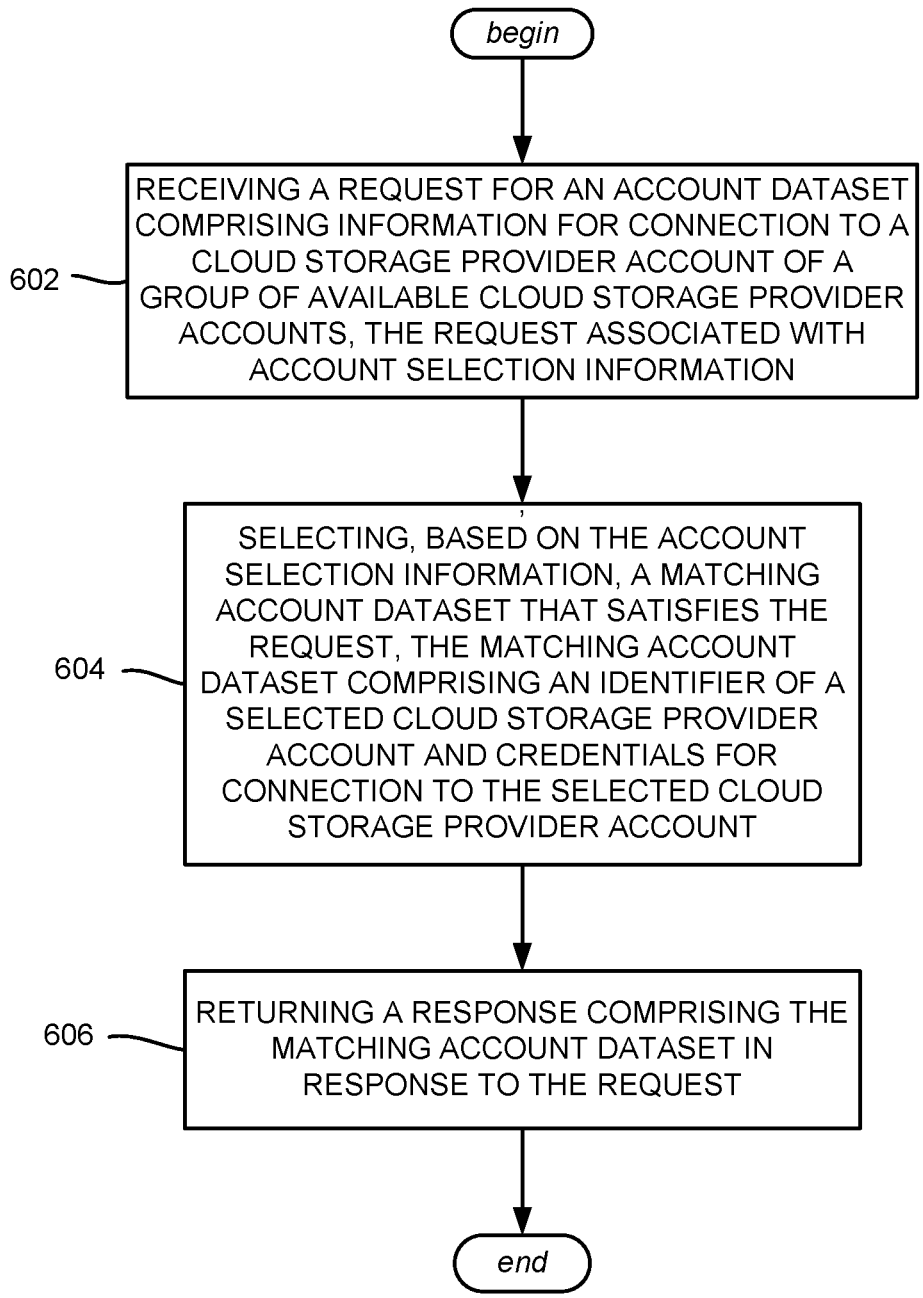
FIG. 6 is a flow diagram showing example operations related to selecting an account for connecting to a cloud storage provider based on account selection information, in accordance with various aspects and implementations of the subject disclosure.

One or more aspects can be embodied in a system, such as represented in FIG. 6, and for example can comprise a memory that stores computer executable components and/or operations, and a processor of a data storage system that executes computer executable components and/or operations stored in the memory. Example operations can comprise operation 602, which represents receiving a request for an account dataset comprising information for connection to a cloud storage provider account of a group of available cloud storage provider accounts, the request associated with account selection information. Operation 604 represents selecting, based on the account selection information, a matching account dataset that satisfies the request, the matching account dataset comprising an identifier of a selected cloud storage provider account and credentials for connection to the selected cloud storage provider account. Operation 606 represents returning a response comprising the matching account dataset in response to the request.

The account selection information can indicate random account selection, and the selecting the matching account dataset can comprise performing random selection from a group of account datasets corresponding to the group of available cloud storage provider accounts.

Selecting the matching account dataset can comprise obtaining two or more candidate account datasets that each satisfy the account selection information and selecting the matching account dataset based on random selection from the candidate account datasets.

The account selection information can specify weight data that gives preference to at least one available cloud storage provider account; selecting the matching account dataset can comprise obtaining two or more candidate account datasets that each satisfy the account selection information and selecting the matching account dataset based on using the weight data to bias a pseudorandom selection of the matching account dataset from the candidate account datasets.

Further operations can comprise tracking usage of respective cloud storage provider Selecting the matching account dataset can comprise obtaining two or more candidate account datasets that each satisfies the account selection information, and selecting the matching account dataset based on which of the candidate account datasets has a least usage.

Selecting the matching account dataset can comprise obtaining two or more candidate account datasets that each satisfy the account selection information, and selecting the matching account dataset based on a lower storage cost corresponding to one of the two or more candidate account datasets.

The account selection information can specify workgroup information, and selecting the matching account dataset can comprise filtering out account datasets from the group of available cloud storage provider accounts that do not match the workgroup information.

The account selection information can specify cloud provider type information, and selecting the matching account dataset can comprise filtering out account datasets from the group of available cloud storage provider accounts that do not match the cloud provider type information.

The account selection information can specify property information, and selecting the matching account dataset can comprise filtering out account datasets from the group of available cloud storage provider accounts that do not match the property information.

The property information can comprise at least one of region data and/or storage tier data.

Further operations can comprise maintaining a data store comprising the group of available cloud storage provider accounts, and updating the credentials of one of the group of available cloud storage provider accounts.

Receiving the request can comprise receiving a REST API call, and returning the matching account dataset in response to the request can comprise returning a REST response.

Figure 7:
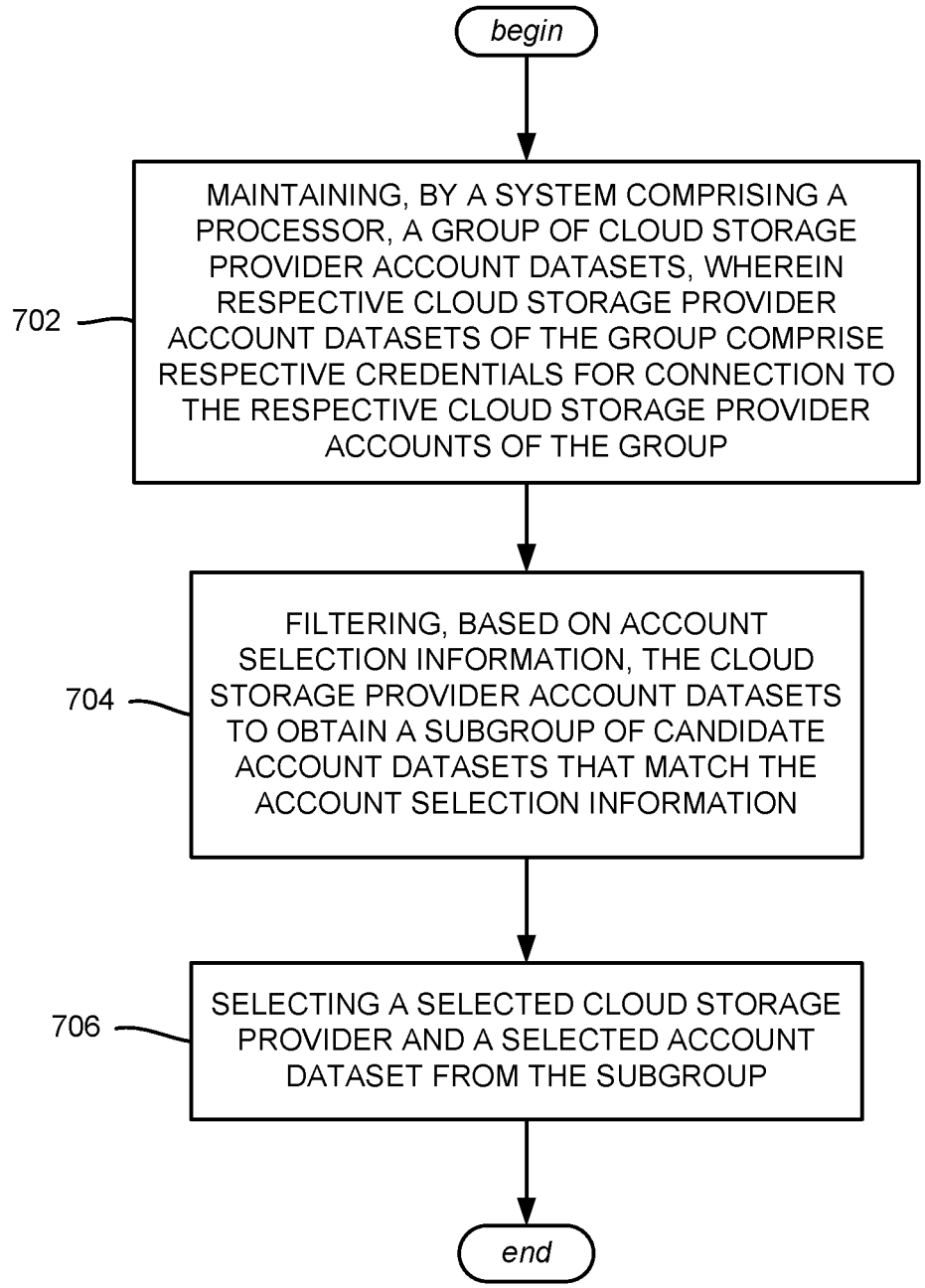
FIG. 7 is an example flow diagram showing example operations related to maintaining account datasets for cloud storage provider accounts, and filtering to select a cloud storage provider and account, in accordance with various aspects and implementations of the subject disclosure, in accordance with various aspects and implementations of the subject disclosure.

One or more example aspects, such as corresponding to example operations of a method, are represented in FIG. 7. Operation 702 represents maintaining, by a system comprising a processor, a group of cloud storage provider account datasets, wherein respective cloud storage provider account datasets of the group comprise respective credentials for connection to the respective cloud storage provider accounts of the group. Operation 704 represents filtering, based on account selection information, the cloud storage provider account datasets to obtain a subgroup of candidate account datasets that match the account selection information. Operation 706 represents selecting a selected cloud storage provider and a selected account dataset from the subgroup.

Aspects can comprise receiving, by the system, a request for the account dataset, the request associated with the account selection information, and returning the selected cloud storage provider and the selected account dataset in response to the request.

Aspects can comprise tracking usage of respective cloud storage provider accounts of the group of cloud storage provider accounts, and selecting the selected cloud storage provider and the selected account dataset can be based at least in part of usage of the selected cloud storage provider.

Selecting the selected cloud storage provider and the selected account dataset can comprise performing a random selection or pseudorandom selection from the subgroup.

Figure 8:
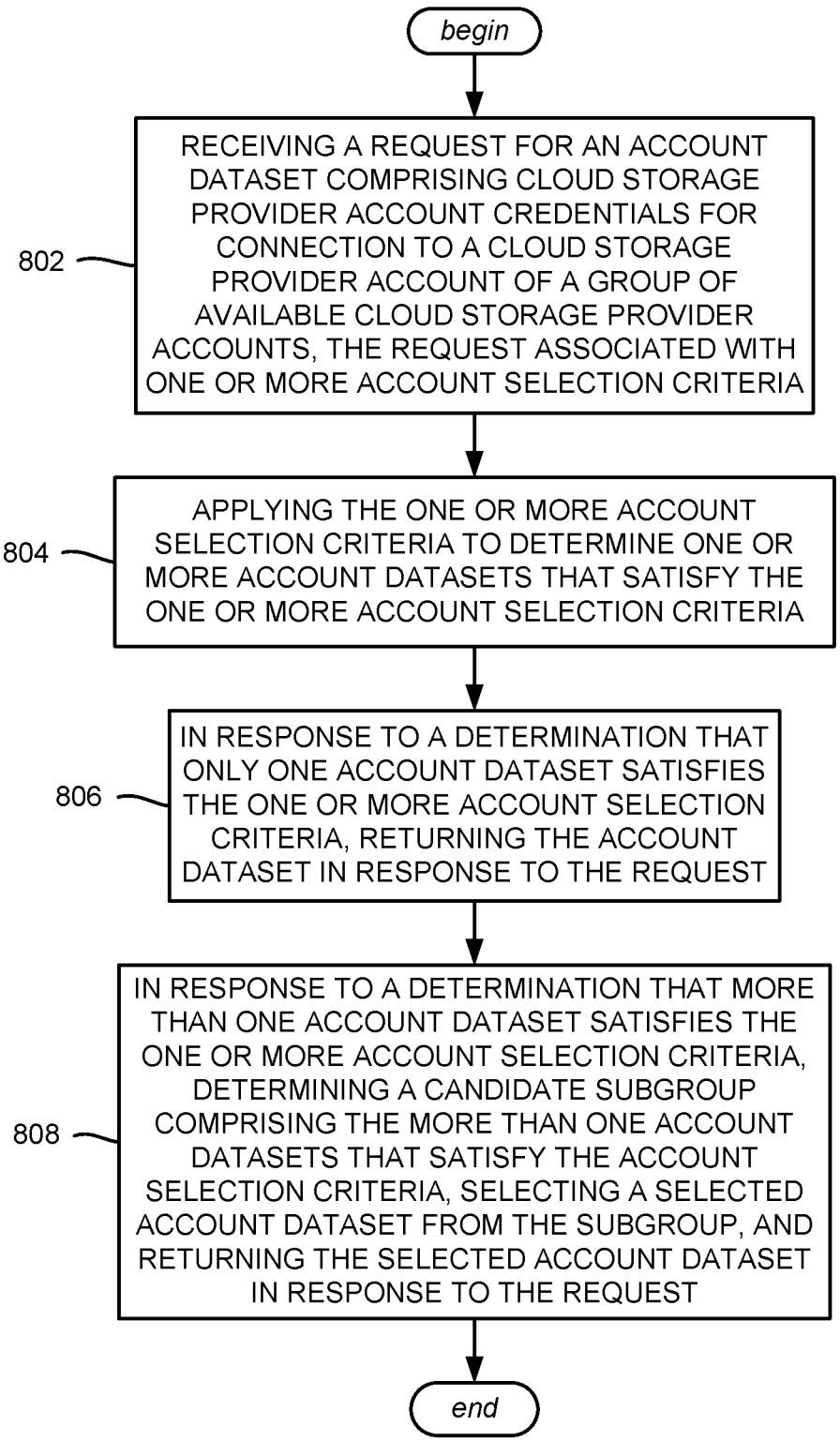
FIG. 8 is an example flow diagram showing example operations related to applying selection criteria to select a cloud storage provider account, including when multiple candidate accounts are available, in accordance with various aspects and implementations of the subject disclosure.

FIG. 8 summarizes various example operations, e.g., corresponding to a machine-readable storage medium, comprising executable instructions that, when executed by a processor of a streaming data storage system, facilitate performance of operations. Operation 802 represents receiving a request for an account dataset comprising cloud storage provider account credentials for connection to a cloud storage provider account of a group of available cloud storage provider accounts, the request associated with one or more account selection criteria. Operation 804 represents applying the one or more account selection criteria to determine one or more account datasets that satisfy the one or more account selection criteria. Operation 806 represents, in response to a determination that only one account dataset satisfies the one or more account selection criteria, returning the account dataset in response to the request. Operation 808 represents, in response to a determination that more than one account dataset satisfies the one or more account selection criteria, determining a candidate subgroup comprising the more than one account datasets that satisfy the account selection criteria, selecting a selected account dataset from the subgroup, and returning the selected account dataset in response to the request.

More than one account dataset can satisfy the one or more account selection criteria, and selecting the selected account dataset from the subgroup can comprise performing random selection.

Further operations can comprise maintaining usage data for the cloud storage provider accounts, and more than one account dataset can satisfy the one or more account selection criteria; selecting the selected account dataset from the subgroup can comprise evaluating the usage data.

As can be seen, described herein is a technology that facilitates connecting to a cloud storage provider account in a manner that overcomes the drawbacks of prior solutions. The technology provides for selection of a cloud storage provider account, including by random or pseudorandom selection, property-based selection, load balancing-based selection and/or cost-based selection.

Figure 9:
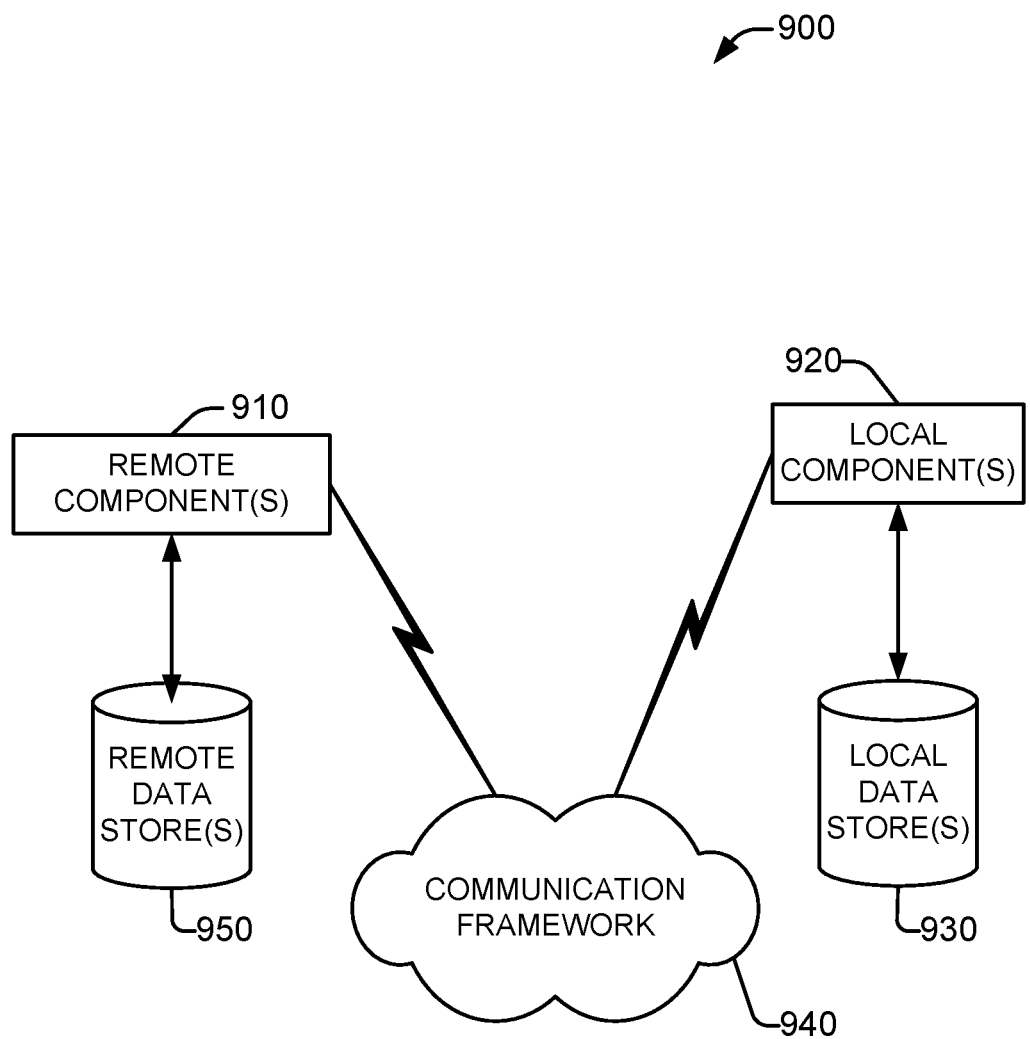
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
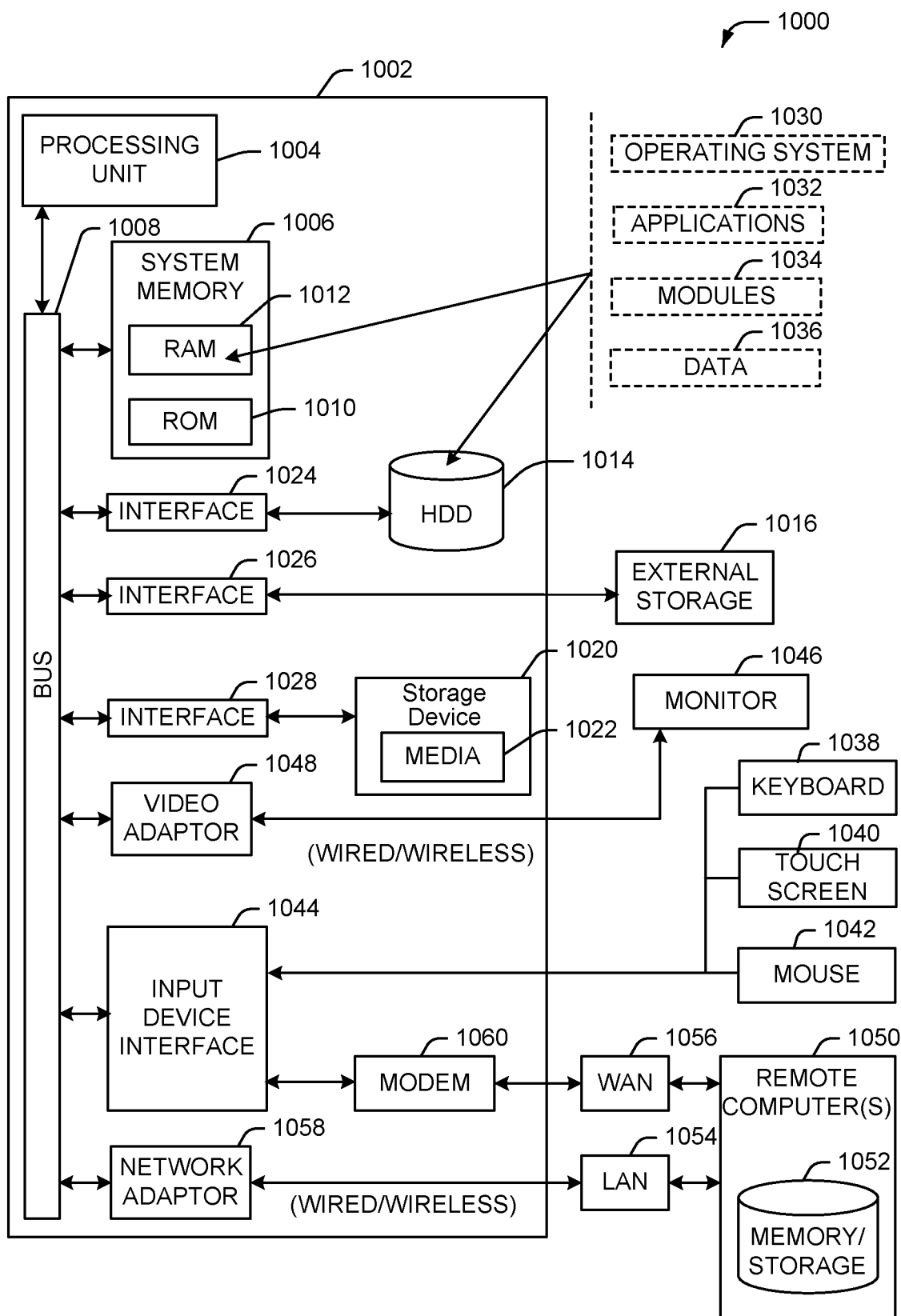
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A user device, comprising:
a processor;
and a memory that stores executable instructions that, when executed by the processor of a data storage system, facilitate performance of operations, the operations comprising:
receiving a request, associated with a first user, for an account dataset, wherein the request comprises account selection information for connection to a cloud storage provider account of a group of available cloud storage provider accounts, and wherein the request is a query for a matching account dataset having available memory to store data and is conducted prior to storing the data at one or more of the group of available cloud storage provider accounts;
querying a cloud credential data store comprising the group of available cloud storage provider accounts, wherein the cloud credential data store comprises first credentials associated with the first user and second credentials associated with a second user, the first user and the second user both enabled for access to the one or more group of available cloud storage provider accounts;
selecting, based on the account selection information, the matching account dataset that satisfies the request, the matching account dataset comprising an identifier of a selected cloud storage provider account and credentials for connection to the selected cloud storage provider account, wherein the matching account dataset is also available to the second user and the second credentials were previously established for the second user, and wherein the matching account dataset is available to store the data; and
returning, to the first user, a response comprising the matching account dataset and the second credentials to access the matching account dataset, thereby enabling subsequent storage of the data via instructions associated with the first user at the selected cloud storage provider.

2. The user device of claim 1, wherein the account selection information indicates random account selection, and wherein the selecting the matching account dataset comprises performing random selection from a group of account datasets corresponding to the group of available cloud storage provider accounts.

3. The user device of claim 1, wherein the selecting the matching account dataset comprises obtaining two or more candidate account datasets that each satisfy the account selection information and selecting the matching account dataset based on random selection from the candidate account datasets.

4. The user device of claim 1, wherein the account selection information specifies weight data that gives preference to at least one available cloud storage provider account, and wherein the selecting the matching account dataset comprises obtaining two or more candidate account datasets that each satisfy the account selection information and selecting the matching account dataset based on using the weight data to bias a pseudorandom selection of the matching account dataset from the candidate account datasets.

5. The user device of claim 1, wherein the operations further comprise tracking usage of respective cloud storage provider accounts of the group of available cloud storage provider accounts.

6. The user device of claim 5, wherein the selecting the matching account dataset comprises obtaining two or more candidate account datasets that each satisfy the account selection information, and selecting the matching account dataset based on which of the candidate account datasets has a least usage.

7. The user device of claim 1, wherein the selecting the matching account dataset comprises obtaining two or more candidate account datasets that each satisfy the account selection information, and selecting the matching account dataset based on a lower storage cost corresponding to one of the two or more candidate account datasets.

8. The user device of claim 1, wherein the account selection information specifies workgroup information, and wherein the selecting the matching account dataset comprises filtering out account datasets from the group of available cloud storage provider accounts that do not match the workgroup information.

9. The user device of claim 1, wherein the account selection information specifies cloud provider type information, and wherein the selecting the matching account dataset comprises filtering out account datasets from the group of available cloud storage provider accounts that do not match the cloud provider type information.

10. The user device of claim 1, wherein the account selection information specifies property information, and wherein the selecting the matching account dataset comprises filtering out account datasets from the group of available cloud storage provider accounts that do not match the property information.

11. The user device of claim 10, wherein the property information comprises at least one of region data or storage tier data.

12. The user device of claim 1, wherein the operations further comprise maintaining a data store comprising the group of available cloud storage provider accounts, and updating the credentials of one of the group of available cloud storage provider accounts.

13. The user device of claim 1, wherein the receiving the request comprises receiving a representational state transfer (REST) application programming interface call, and wherein the returning the matching account dataset in response to the request comprises returning a REST response.

14. A method, comprising:
maintaining, at a user device comprising a processor and a memory, a group of cloud storage provider account datasets, wherein respective cloud storage provider account datasets of the group are stored in the memory and comprise first credentials for a first user and second credentials for a second user for connection to respective cloud storage provider accounts associated with the respective cloud storage provider account datasets of the group;

receiving a query, associated with the first user, comprising information for data to be stored at one or more of the cloud storage provider accounts associated with the respective cloud storage provider account datasets;

filtering, based on account selection information in the query, the respective cloud storage provider account datasets to obtain a subgroup of candidate account datasets that match the account selection information; and selecting, for the first user, a cloud storage provider and an account dataset from the subgroup, resulting in a selected cloud storage provider and a selected account dataset, wherein the selecting facilitates subsequent storage of the data based on input received via access associated with the first user at the selected cloud storage provider, wherein the second credentials enable access to the selected account dataset in association with the second user.

15. The method of claim 14, further comprising returning the selected cloud storage provider and the selected account dataset in response to the request, and receiving an instruction to store the data at the selected account dataset.

16. The method of claim 14, further comprising tracking usage of respective cloud storage provider accounts of the group of cloud storage provider accounts, and wherein the selecting the cloud storage provider and selected account dataset is based at least in part of usage of the cloud storage provider.

17. The method of claim 14, wherein the selecting the cloud storage provider and the account dataset comprises performing a random selection or pseudorandom selection from the subgroup.

18. A non-transitory machine-readable medium, comprising executable instructions that, when executed by a processor of a data storage system, facilitate performance of operations, the operations comprising:

receiving, from a first user device associated with a first user, a request for an account dataset, wherein the request comprises cloud storage provider account credentials for connection to a cloud storage provider account of a group of cloud storage provider accounts assigned to the first user and a second user, the request associated with one or more account selection criteria, and wherein the request is received prior to storage of data at one or more accounts in the group of available cloud storage provider accounts and comprises a query for a matching account dataset to facilitate subsequent storage of the data;

applying the one or more account selection criteria to determine one or more account datasets that satisfy the one or more account selection criteria, wherein the one or more account datasets are available to store the data and have been previously accessed by a second user device associated with the second user;

in response to a determination that only one account dataset satisfies the one or more account selection criteria, returning the account dataset in response to the request; and in response to a determination that more than one account dataset satisfies the one or more account selection criteria, determining a candidate subgroup comprising the more than one account datasets that satisfy the account selection criteria, selecting an account dataset from the subgroup resulting in a selected account dataset, and returning the selected account dataset in response to the request.

19. The non-transitory machine-readable medium of claim 18, wherein more than one account dataset satisfies the one or more account selection criteria, and wherein the selecting the account dataset from the subgroup comprises performing random selection.

20. The non-transitory machine-readable medium of claim 18, wherein the operations further comprise maintaining usage data for the cloud storage provider accounts, wherein more than one account dataset satisfies the one or more account selection criteria, and wherein the selecting the account dataset from the subgroup comprises evaluating the usage data.

* * * * *